United States Patent [19]

Paterson

[11] 3,980,190
[45] Sept. 14, 1976

[54] PAVING SLAB HANDLING DEVICE

[76] Inventor: Patrick James Paterson, Box 703, R.R. No. 5, Ottawa, Ontario, Canada, K1G 3N3

[22] Filed: Oct. 24, 1975

[21] Appl. No.: 625,703

[52] U.S. Cl. ............................... 214/383; 294/81 R
[51] Int. Cl.² ......................................... B62B 1/06
[58] Field of Search ........... 214/375, 377, 378, 379, 214/380, 381, 382, 383, 653, 654; 254/8 R, 8 B, 8 C; 294/81 R

[56] References Cited
UNITED STATES PATENTS

| | | | |
|---|---|---|---|
| 3,273,931 | 9/1966 | Caldwell et al. .................. | 294/81 R |
| 3,645,412 | 2/1972 | Brown ................................ | 214/377 |
| 3,885,688 | 5/1975 | Larsen ............................... | 254/8 R X |

*Primary Examiner*—Albert J. Makay

[57] ABSTRACT

The installation of precast concrete paving slabs as used in the construction of paths, patios and swimming pool decks involves heavy and cumbersome lifting, risk of injury to the worker's hands and, using conventional tools, a possibility of breaking and chipping slabs. The task is made more difficult by the close proximity of one slab to the next, a matter of particular significance when it is required to raise and reset an existing installation. In the present invention a wheeled hand barrow supporting a gripping means attached to the slab reduces the lifting load, eliminates dangerous handling, permits slabs to be gripped when closely laid and generally overcomes the aforesaid difficulties. Two flanged jaws, separated by the width of the slab, are hinged to a horizontal extensible beam and may be urged inwardly by an outward thrust imparted to their upper ends by a push rod operating in mutual opposition between the jaws. Tightening of the jaws is achieved by a cam integral with the push rod. By selective extension of the beam and the push rod to one of several lockable lengths, the correct jaw spacing for different standard sizes of paving slabs is provided. The slab is raised and moved by a wheeled hand barrow consisting of a two-bar frame joined by a wheel axle at one end and between the ends by a cross-bar from which the beam is pendulously suspended by a pair of hooked members extending vertically from the beam mid-distance between the jaws. The hooks in cooperation with a latch thereon, are retained in assembly with the barrow or selectivey detached therefrom to facilitate placing and removing the jaws from the slab. A vertically rotative lockable swivel joint is interposed between the beam and the hook to permit the slab to be gripped either longitudinally or transversely with respect to the barrow. The features embodied in the present invention specifically overcome the unique difficulties of installing precast paving slabs for which purpose existing manual tools and lifting or carrying devices are not efficacious.

8 Claims, 4 Drawing Figures

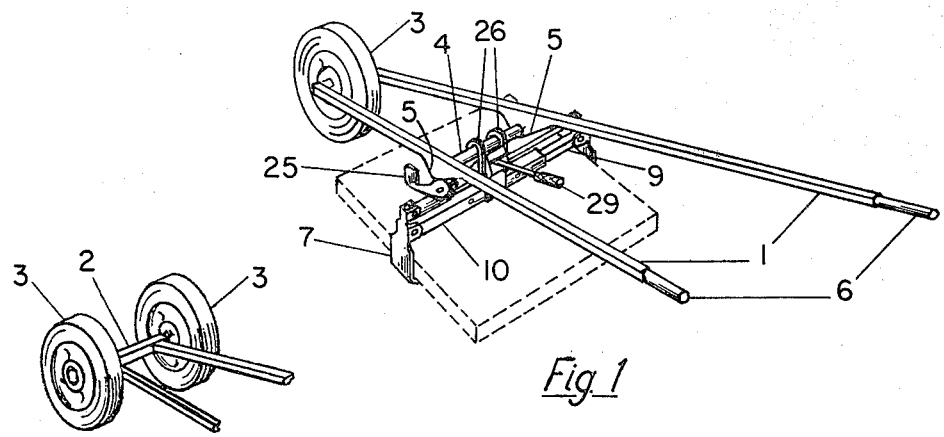
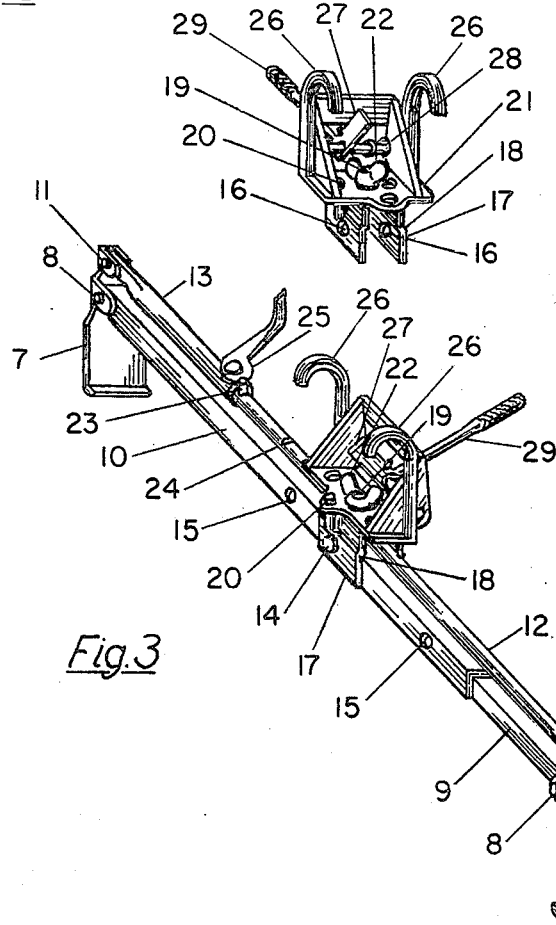

PAVING SLAB HANDLING DEVICE

This invention relates to the handling of paving slabs and has particular reference to the transportation and placement of precast paving slabs as used in the construction of paths, patios and swimming pool decks.

It is a matter of experience that the preferred sizes of commercially available precast rectangular slabs used for the construction of sidewalks, patios and swimming pool decks are both heavy and cumbersome for a single person to lift, carry and place in position. The present invention, the embodiment of which consists of a two-jaw gripping assembly pendulously attached beneath the frame of a wheeled hand barrow, facilitates the movement and placement of said slabs.

According to the present invention the slab is held securely between opposing and inwardly urging jaws which are flanged at their lower edges. By means of a tightening mechanism the jaws are brought into contact with the side faces of the slab at about the mid position of either pair of opposite sides and a positive grip is achieved by the protrusion of said flanges beneath the lower surface of the slab.

With the slab so held, it may be transported, lowered and otherwise moved as the skill of laying paving slabs requires, by manipulation of the barrow, the advantage arising therefrom being the reduction of the lifting force required by the operator and the facility of applying that force through conveniently located hand grips. The pendulous suspension of the slab, which is an essential feature of the invention, allows the slab to maintain a substantially horizontal attitude independent of the raising and lowering of the barrow handles.

It is known that a further difficulty arises with regard to the positioning of a rectangular slab in close proximity to adjacent previously positioned slabs because of the clearance required to accommodate the operator's hands or a lifting tool, such as a pry. In the present invention the jaws are designed to have a flat profile thereby allowing slabs to be placed in relatively closer proximity to adjacent slabs.

A particular advantage from the use of the present invention arises when it is necessary repetitiously to place and remove a slab for the purpose of adjusting and testing the level of the supported sand base. The procedure is carried out more quickly and with less operator effort than when the slab is manhandled. Indeed the operator may facilitate the levelling and consolidation of the sand by using the slab so gripped as a tamp.

A further advantage arises when obtaining a flush fit between the edges of adjacent slabs. If a slab after final levelling has to be shifted laterally through a significant distance to close the gap between it and adjacent slabs there is a tendency for the supporting sand to become dislodged and consequently to destroy the level. The close proximity with which slabs may be placed by use of the present invention inhibits significant movement of the sand when the slab is finally brought into flush contact with neighbouring slabs.

In a preferred construction of the present invention the jaws function as simple levers attached by hinge pins to the extremities of a beam, which when in use occupies a position above and essentially bisecting the upper surface of the slab to be lifted. The lower flanged edges of the jaws are urged mutually inward to grip the slab by an outward thrust applied directly and interdependently between the upper ends of the pair of jaws by means of a push rod and manually operated cam. To accommodate the several commercially standard sizes of paving slabs the beam and the push rod each embody two telescoping parts and a means of locking the extended parts to provide the appropriate span between the jaws.

Experience has shown that under certain conditions the attachment and the withdrawal of the jaws to and from the slab are more conveniently carried out if the barrow is separated and removed from the jaw assembly and in a preferred embodiment of the invention the jaw assembly is attached to the barrow by hooks on said jaw assembly which engage a corresponding crossbar on the barrow thereby allowing the barrow to be unhooked when required. The attachment by means of hooks engaging a crossbar also provides the articulating connection required for the pendulous suspension of the slab. This arrangement is further facilitated by a manually operated spring loaded latch which inhibits inadvertent disengagement of the hooks from the crossbar.

Experience has shown that the art of laying slabs, particularly in a restricted space, requires the optional selection of the position of the jaws either transverse or in line with the lengthwise axis of the barrow. In the preferred embodiment of the invention this optional selection is achieved by a vertically rotative swivel joint between the beam and the hooks with means for locking the beam relative to the hooking axis in either of the aforesaid optional directions.

Experience has shown that it is a convenience for the operator to have selectivity between greater or lesser height of the lifting handles relative to the level of the slab and in a preferred embodiment of the invention the crossbar of the barrow is offset from the plane containing the handles and wheel axis. By inverting the barrow greater or lesser handle height may be selected.

A specific embodiment of the present invention will now be described with reference to the accompanying drawing in which:

FIG. 1 shows an oblique view of a single wheeled barrow with jaw assembly and a paving slab attached, in which the jaw assembly is in the transverse optional position.

FIG. 2 shows an oblique scrap view of the two wheeled barrow.

FIG. 3 shows an oblique view of the jaws, beam push rod, yoke and hook assembly with the swivel joint set in one of the optional positions.

FIG. 4 shows the yoke and hook detail with the swivel joint set in an alternate optional position.

The spaced bars 1 which together with handles 6 attached thereto form the load bearing structure of the barrow terminate at their mutually convergent ends in an axle carrying the single wheel 3 and in an alternate embodiment terminate in an axletree 2 upon which the laterally spaced wheels 3 are hung. The crossbar 4 joining the spaced bars 1 is fixed to projections 5 extending perpendicularly from the spaced bars 1 at about their mid length. The consequence of this configuration is the displacement of the crossbar 4 out of the plane containing the spaced bars 1, the axis of the wheel or wheels 3 and the handles 6. Be it understood that the geometric requirement of this configuration could also be realized by curving the spaced bars 1. Each of the jaws 7 flanged at its lower edge is configured in its upper part to include two superimposed U shaped extensions which form the female elements of hinges, providing a lower hingeable connection with the hinge pin 8 to the extremity of the beam part 9 or 10 and an upper hingeable connection with the hinge pin 11 to the extremity of the push rod part 12 or 13.

The beam part 9 having a rectangular cross section, is sized to fit slideably within the channel cross section of beam part 10 to provide a telescoping extension of the combined parts. The beam parts 9 and 10 are rigidly locked together at selective positions by the bolt 14 passing transversely through the central set of appropriately aligned optional holes 15 in both beam parts. The bolt 14 also passes through the holes 16 in a channel shaped yoke 17 sized to embrace the side surfaces of the beam part 10. The yoke 17 is prevented from rotating about the bolt 14 by shoulders 18 overlapping the upper edges of the beam part 10.

A centrally placed vertical screw 19 and an offset vertical index pin 20 extend upward from the top surface of the yoke 17. The screw 19 passes through a central hole in the base plate 21 which is secured to the yoke by the wing nut 22 and the index pin 20 passes through one of four quadrantally positioned holes in the base plate 21 to fix the orientation of the hooks 26 mounted thereon with respect to the orientation of the jaws 7.

The hooks 26 sized to freely engage the crossbar 4 are mutually separated to provide torsional rigidity between the barrow and the suspended load.

Positive coupling of the jaw assembly to the barrow is maintained by the latch bar 27 which limits the downward movement of the crossbar 4 relative to the hooks 26 and which is retained in the closed position by the spring 28. Release is achieved by depression of the handle 29 thereby swinging the latch bar 28 clear of the hook openings.

The push rod assembly which acts at its extremities upon the jaws 7 through the hinge pins 11 consists of a solid rod 12 slideably protruding from a tubular part 13. The extension of these telescoping parts is selectively set by locating the cam follower pin 23 in one of several holes 24 in the rod 12. The extensibly outward urging of the push rod to tighten the jaws 7 is achieved by the cam 25 pivotally attached to the push rod tube 13 thrusting against the pin 23.

I claim:

1. A device for the handling of precast paving slabs, comprising an opposed pair of jaws, horizontally and inwardly flanged at their lower edges and suspended intermediate their upper and lower ends by means of horizontal hinge pins, an extensible push rod cooperating at its ends with the upper extremities of said jaws, a horizontal beam structure supporting said hinge pins, a pair of parallel members rigidly attached to and projecting vertically upward from the mid-length of said beam structure and each terminating in a hook, a pair of spaced bars with handles at one end joined at their other end by a wheel axle with one wheel thereon and at a position between their ends by a crossbar sized to be enclosed by and to pivotally suspend said hooks.

2. A device as defined in claim 1 in which said beam structure consists of two telescoping parts, slideably joined so that each part is an extension of the other part, wherein each part is hingeably connected at its extremity to a said jaw.

3. A device as defined in claim 1 in which the said push rod consists of two coaxially slideable parts, the relative extensible movement between the parts being controlled by a cam pivotted to one part acting against a cam follower connected to the other part, which cam follower is movable on its part to provide selective gross adjustment of the push rod length.

4. A device as defined in claim 1 in which the said hooks are connected to the said beam structure by a vertically rotative swivel joint with quadrantal indexing and locking means.

5. A device as defined in claim 2 in which the said beam structure parts are held in fixed extension by a bolt passing transversely through both parts and through a yoke situated at the mid distance between the extremities of the parts, which yoke forms the lower member of a vertically rotative swivel joint between the said beam structure and the said hooks.

6. A device as defined in claim 1 in which the said crossbar may be restrained from disengaging the said hooks by means of a manually operated latch comprising a spring loaded hinged arm mounted between said hooks and caused to rotate its free end into engagement with the lower face of said crossbar.

7. A device as defined in claim 1 in which an end of each said spaced bar is joined to an axletree with two wheels terminally mounted thereon.

8. A device as defined in claim 1 in which the said spaced bars are joined by a said crossbar positioned to be displaced from but parallel to, the plane containing the said wheel axle or said axletree and the said handles.

* * * * *